United States Patent [19]
Brooks

[11] 3,928,107
[45] Dec. 23, 1975

[54] MANUFACTURE OF GASKETS
[75] Inventor: Henry W. Brooks, Epping, England
[73] Assignee: Engineering Components Limited, Slough, England
[22] Filed: July 9, 1974
[21] Appl. No.: 486,814

[30] Foreign Application Priority Data
July 13, 1973 United Kingdom............... 33467/73

[52] U.S. Cl. ............... 156/217; 156/218; 156/242; 156/285; 156/294; 156/304
[51] Int. Cl.²................... B29C 17/07; B29D 23/10
[58] Field of Search .......... 156/189, 191, 194, 195, 156/217, 218, 285, 287, 293, 294, 304, 306, 381, 382; 285/DIG. 11

[56] References Cited
UNITED STATES PATENTS

| | | | |
|---|---|---|---|
| 1,855,041 | 4/1932 | Bodony | 156/218 |
| 3,663,332 | 5/1972 | Gard | 156/217 |
| 3,773,593 | 11/1973 | Casadevall et al. | 156/294 |

*Primary Examiner*—Caleb Weston
*Attorney, Agent, or Firm*—Baldwin, Wight & Brown

[57] ABSTRACT

A method of producing cork gaskets includes the steps of forming at least two tubes of cork composition sheet material, the inside diameter of one tube being substantially the same as the outside diameter of the other tube, assembling the tubes one inside the other with a layer of adhesive at their interface, bag-moulding the assembly around a form whilst curing the adhesive, followed by slicing through the axis of the moulded assembly to produce thin sections.

10 Claims, No Drawings

MANUFACTURE OF GASKETS

The present invention relates to the manufacture of sheet form artefacts such as gaskets, jointings or packings from cork compositions, typically comprising finely divided cork and a binder. For convenience, all such artefacts will be referred to simply as cork gaskets in this specification.

Cork gaskets are commonly made by forming a thick block of cork composition, slicing it transversely into sheets each having the desired thickness of a single gasket, followed by punching out the gasket shape from a sheet or stack of sheets. This basic method is very wasteful of material and the process is normally modified to include the steps of forming on the cork composition block, apertures corresponding to at least the major openings in the finished gaskets. This saves some waste, but not all.

One possible solution to the problem of punching-/cutting waste is offered in U.S. Pat. No. 3,663,332 in which relatively thin sheet material is formed into a generally cylindrical loop, opposite edges of the sheet being adhesive-treated before abutting them. This loop is moulded under heat and pressure into the shape of the gasket, the moulding operation being carried out using moulds which completely enclose the loop and force it against a shaped core, the moulds and core being accurately matched to ensure the accuracy of the finished gaskets. The resultant tube is sliced in a direction normal to its axis into individual gaskets of the desired thickness, the width of the gasket section being of course determined by the thickness of the sheet from which the loop was formed. The need for accurately matched moulds is a disadvantage of this process, although the waste produced is minimal.

According to the present invention a method of producing cork gaskets comprises the steps of forming at least two tubes of cork composition sheet material, the inside diameter of one tube being substantially the same as the outside diameter of the other tube, assembling the tubes one inside the other with a layer of adhesive at their interface, bag-moulding the assembly around a form whilst curing the adhesive, followed by slicing through the axis of the moulded assembly to produce thin sections.

Usually, but not necessarily, successive slices are parallel and normal to the axis of the moulded assembly so as to produce sections of uniform thickness.

Preferably the moulding operation is carried out at ambient temperature.

The bag-moulding step may be carried out by evacuating a bag containing the tubes on the form, or fluid pressure may be applied externally of the bag by means of a pressure chamber. In the latter case, the bag must naturally be vented to the outside of the chamber in order to allow it to collapse around the tube and form.

We have found that the presence of the adhesive, which is allowed to cure or set during the moulding operation, has the effect of holding the tubes in the moulded shape, determined by the form. We have also found that by using at least two tubes as just described it is possible to work with sheets of cork composition in which the binder is already fully cured. This is advantageous in that the density and hence the permeability of the gasket is easier to control. The matched mould process mentioned earlier relies on flow of the composition during the moulding step and this may give rise to local density variations in the finished gasket.

We have also found that it is preferable that in order to produce a gasket having a generally rectangular shape with a pair of truly parallel opposed sides, the form should have a waisted section, viewed in the plane of the slice. Waisting the form in this way allows for the slight bowing of the gasket sides when the moulding pressure is removed. For square, or nearly square gaskets, the use of a waisted section in two planes is advantageous. The exact extent of the waisting required is determined by the need to obtain a gasket with parallel sides, but because the form can be of a low-cost material such as plywood and because there is no need to effect a corresponding shaping of surrounding female mould parts, the actual manufacture of suitable forms is easy, for example, by means of a power driven fretsaw or bandsaw.

The simplicity of the form used in our process clearly permits a reduction in overall tooling costs, as even if a form is made in the wrong shape or if it is damaged in some way, the cost of a replacement is low in comparison with the cost of similar tooling using matched moulds where not one but three surfaces have to be accurately profiled to the desired shape.

A preferred embodiment of the invention will now be described in the following example.

EXAMPLE

A rectangular cork composition sheet was formed into a cylinder after coating the edges of two opposed sides with a heat-curable adhesive. The coated edges were held in abutting relation by pushing the cylinder into a metal tube of internal diameter not greater than the external diameter of the cylinder. The exact diameter of the metal tube is chosen according to the resilience of the cork composition and the pressure required to effect the desired joint between the edges of the sheet. The adhesive was caused to set by heating the tube and the cylinder removed and placed around a waisted form. A second rectangular cork composition sheet was formed into a cylinder and placed around the form inside the first cylinder, the length of the second sheet being slightly smaller than that of the first sheet so as to allow it to be a snug fit inside the first cylinder. Before forming the second cylinder the edges to be abutted were coated with an adhesive settable at ambient temperature. The face of the sheet which was to be the outer surface of the second cylinder was also coated with the same adhesive. The butt joint of the second cylinder was arranged to lie on the opposite side of the form to the joint in the first cylinder.

The assembly was then placed inside a length of thin, flexible tubing of the kind used to make plastic bags. One end of the length of tubing was clamped and the other end connected to a vacuum pump. On applying the vacuum, the length of tubing collapsed inwardly, applying pressure to the cork composition cylinders so as to clamp them firmly against the form. The adhesive was allowed to cure and the form removed from the tubing. On removing the now fully-shaped tube from the form, it showed a very slight tendency to return to its original cylindrical shape, the adhesive at the interface preventing creep between the two sheets forming the tube. The very slight tendency to return to the cylindrical shape was just sufficient to counteract the effect of the waisted form and the long sides of the generally rectangular gasket shape produced were parallel. The subsequent processing into individual gaskets was carried out conventionally by slicing the tube transversely on a slitting machine.

Although in the example just given the second tube was actually formed inside the first tube, it could also have been made in exactly the same way as the first tube, but of course of somewhat smaller diameter. The assembly procedure is then modified to include the step of sliding the second tube inside the first, after coating its outer surface with adhesive.

The method described is not limited to simple rectangular or square gasket configurations, because by using insert pins and/or shaped in-fill segments between the tubes to be moulded it is possible to produce gaskets of irregular cross-section, with or without any necessary bolt holes.

I claim:

1. A method of producing cork gaskets comprising the steps of forming at least two tubes of cured cork composition sheet material, the inside diameter of one tube being substantially the same as the outside diameter of the other tube, assembling the tubes one inside the other with a layer of adhesive at their interface, bag-moulding the assembly around a form whilst curing the adhesive, followed by slicing through the axis of the moulded assembly to produce thin sections.

2. A method according to claim 1 wherein the bag-moulding step is carried out at ambient temperature.

3. A method according to claim 1 wherein the bag-moulding step is carried out by enclosing the assembled tubes and form inside a bag which is thereafter evacuated.

4. A method according to claim 1 wherein the axially extending joint between the butted edges of the sheet forming one tube is arranged to lie diametrically opposite the axially extending joint between the butted edges of the sheet forming the other tube when the tubes are assembled one inside the other.

5. A method according to claim 1 wherein an assembly of tubes is bag moulded around a former having a waisted section viewed in the plane of the subsequent slice.

6. A method of producing a cork gasket comprising the steps of:

a. providing at least two cured cork sheets formed of finely divided cork and a binder, b. forming a first sheet of said cured cork sheets into a first tube and binding together two opposed edges of said first sheet with a first adhesive, said first tube having a predetermined internal peripheral dimension, c. forming a second sheet of said cured cork sheets into a second tube and binding together two opposed edges of said second sheet with a second adhesive, the length of said second sheet being slightly less than that of said first sheet and said second tube having an external peripheral dimension substantially equal to said first tube internal dimension, d. assembling said second tube in said first tube and around a form with there being an adhesive interface between said tubes, applying external pressure to said outer tube to clamp said tubes to the contour of said form, e. curing said adhesive interface to bond together said tubes, f. removing said external pressure and removing said bonded together and formed tubes from said form, and g. slicing said bonded together and formed tubes transversely of the axis thereof to produce thin sections.

7. A method according to claim 6 wherein:

a. said first tube is formed in a metal tube, b. said first adhesive is a heat-curable adhesive, c. and said first adhesive is set by the application of heat to said metal tube.

8. A method according to claim 7 wherein:

a. said second tube is formed within said first tube, and b. said second adhesive is settable at ambient temperature.

9. A method according to claim 6 wherein:

a. said first tube is formed in a preformed tube, and b. said second tube is formed within said first tube.

10. A method according to claim 6 wherein said second tube is formed within said first tube.

* * * * *